Aug. 24, 1948. R. B. WOODWARD 2,447,831
EVAPORATED AND DEPOSITED BIREFRINGENT FILM COMPRISING AROMATIC
COMPOUND, THE MOLECULES OF WHICH CONTAIN PLANAR GROUPINGS
Filed March 3, 1945

INVENTOR.
Robert B. Woodward
BY
Donald L. Brown
Attorney

Patented Aug. 24, 1948

2,447,831

UNITED STATES PATENT OFFICE 2,447,831

EVAPORATED AND DEPOSITED BIREFRINGENT FILM COMPRISING AROMATIC COMPOUND, THE MOLECULES OF WHICH CONTAIN PLANAR GROUPINGS

Robert B. Woodward, Cambridge, Mass., assignor to Polaroid Corporation, Cambridge, Mass., a corporation of Delaware Application March 3, 1945, Serial No. 580,817

5 Claims. (Cl. 88—65)

This invention relates to optical elements, and more particularly to the production of birefringent optical elements and material.

It is one object of the present invention to provide new and improved birefringent optical elements having the optical properties of a basal section of a uniaxial crystal.

Another object is to provide such a birefringent element in the form of a film comprising an organic compound having molecules containing substantially rigid and planar anisotropic groupings oriented in such manner that said film is optically isotropic for light incident thereon in a predetermined direction, particularly at normal incidence, and is birefringent for light incident thereon in other directions.

A further object is to provide such a birefringent film comprising an unsaturated compound and wherein the unsaturated linkages in the molecules of said compound are oriented parallel to the plane of said film.

A still further object is to provide such a birefringent film by the evaporation and deposition on a supporting element of a transparent organic compound having optically anisotropic molecules, and particularly by the evaporation and deposition of such a compound under high vacuum.

Still further objects are to provide a birefringent film as outlined above comprising a compound whose molecules contain unsaturated rings, to provide such a film wherein said unsaturated rings are benzenoid rings, and to provide such a film comprising a compound whose molecules also contain polar groups.

Figure 1:
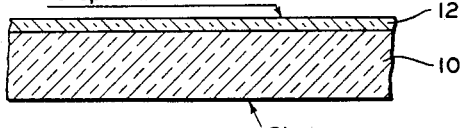
Figure 2:
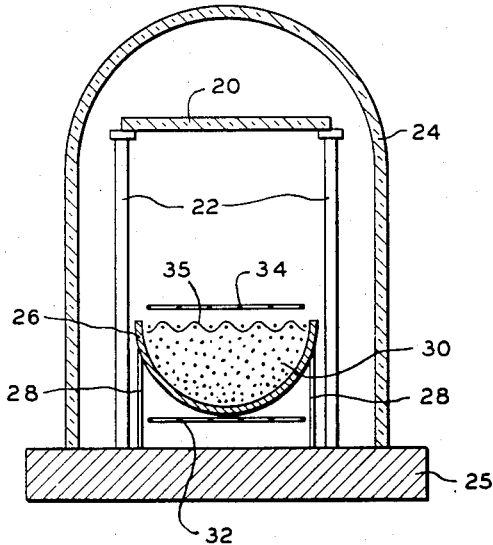

Additional objects and advantages will in part appear and in part be pointed out in the course of the following detailed description of one or more embodiments of the invention, which are given as non-limiting examples, in connection with the accompanying drawings, in which:

Figure 1 is a sectional view illustrating diagrammatically an embodiment of the invention; and Figure 2 is a sectional view illustrating diagrammatically apparatus suitable for producing the embodiment of the invention shown in Fig. 1.

The present invention is concerned with the production of birefringent optical elements which will have optical properties corresponding to those of a basal section of a uniaxial crystal, and particularly with the production of such elements of relatively large area. In accordance with the invention it has been discovered that such elements can be produced by evaporating certain organic compounds and causing the resulting vapor to deposit in a vacuum on a suitable supporting element. A particularly satisfactory example of a suitable compound is terephthalic acid, and Fig. 1 illustrates an embodiment of the invention comprising a support 10 of glass or other suitable material having a film 12 of terephthalic acid formed thereon by evaporation and deposition in a vacuum.

More particularly, this invention relates to a light-transmitting film showing high birefringence and especially to such a film having the optical properties of a basal section of a uniaxial crystal the optic axis of which is at a predetermined angle (preferably normal) to the film surface, the film being formed of a material comprising an aromatic organic compound the molecules of which are substantially rigid, contain an unsaturated linkage together with a polar group (such as a carboxyl or an amino group), said material being deposited by evaporation in a vacuum and being volatilizable at relatively high temperatures without undergoing substantial decomposition; the invention contemplates materials which are structurally planar, contain unsaturated organic bonds, are stable at temperatures of evaporation, more specifically aromatic compounds, preferably terephthalic acid and among others, naphthalic acid, sulfanilic acid, diphenic acid, nicotinic acid, fumaric acid and the like.

Fig. 2 illustrates apparatus suitable for use in the preparation of a device of the type shown in Fig. 1. Plate 20 in Fig. 2 corresponds to element 10 in Fig. 1 and is illustrated as mounted on any suitable supports 22 within bell jar 24, mounted on any suitable base plate 25. It will be understood that any suitable means, not shown, may be provided for evacuating bell jar 24, and maintaining the desired high vacuum therein during the evaporation process. Crucible 26 may be formed from a non-heat-conducting material such as porcelain or a heat-conducting metal such as stainless steel or nickel, in which case it may be insulated from base plate 25 in any suitable manner, as for example by means of legs 28 of porcelain or other relatively non-heat-conducting material. The charge 30 of material to be evaporated is placed within crucible 26 and heat applied thereto by means of filaments 32 and 34 of any suitable metal and shape, a spiral shape having been found desirable. Filaments 32 and 34 may be supported in any way as by means of the lead wires thereto, not shown, and element 36 represents a relatively fine wire screen, the purpose of which will be described hereinafter.

In practicing the invention with the apparatus shown in Fig. 2, it is important that the vacuum within bell jar 24 be as high as possible and be maintained high throughout the evaporation process. Two factors contribute to this requirement. The first is that with all the organic materials used in the practice of the present invention there is at least a slight tendency to decomposition at the temperature of evaporation, and this tendency increases with temperature. At the same time, any decomposition results in a lowering of the vacuum, which in turn raises the temperature necessary for evaporation and hence encourages more rapid decomposition, and these effects are cumulative unless any decomposition products are removed as rapidly as they form. The other factor is related to the same problem and is that organic molecules generally tend to hold a substantial amount of entrapped air or gas which will be released during evaporation and will thereby similarly reduce the vacuum and encourage decomposition. A vacuum as high as $10^{-6}$ mm. of mercury is desirable and for preferred results it should not be permitted to drop below $10^{-4}$ mm. of mercury.

Control of heat in the material to be evaporated is of substantial importance, and particularly uniform control of heat. For preferred results the entire charge should be heated to the vaporizing temperature before any evaporation begins. It is desirable that the charge vaporize and deposit on plate 20 in units as small as possible, i. e., molecules or groups of a very small number of associated molecules. When the evaporation is not uniform, it appears that the vaporized material tends to carry up with it particles of substantially greater than molecular size, and they in turn tend to cause loss of clarity and uniformity in the deposited coating. After evaporation begins, the control of heat is somewhat a matter of balance between maintaining the evaporation both rapid and uniform and holding to a minimum the decomposition which may result if the temperature rises too high. The preferred operating range of temperatures will vary with different materials. For example, in the case of terephthalic acid preferred results have been obtained at a temperature of the order of 315° C., and if the temperature rises substantially above 350° C. decomposition will become so rapid as to become a serious problem. In general, it appears that the safe operating range is from the temperature at which evaporation begins up to not more than approximately 40° C. higher.

Control of the conditions of evaporation within the desired range may be aided in a variety of ways. For example, the use of a heat-conducting crucible and the two filaments 32 and 34 in Fig. 2 aids in producing uniformly rapid heating of the charge. Screen 35 is of assistance in trapping particles of sizes such that they might affect the quality of the deposited film and is, therefore, preferably of relatively fine mesh. For example, a 200-mesh screen of bronze or stainless steel wire has been found satisfactory. Other factors of importance are the distance and angular relation between plate 20 and crucible 26, which are dependent upon a number of variables. It is desirable to prevent the temperature of the plate from rising too high, approximately 60 to 65° C. being the preferred upper limit, and the plate should therefore not be placed too near the crucible, from 3½ to 4 inches being a preferred minimum distance. It is also preferred that the vaporized particles from the crucible deposit on the plate at as nearly normal incidence as possible, and the relative positions of the plate and crucible should be determined accordingly. For example, if the plate is positioned directly over the crucible as in Fig. 2, its lower surface should be substantially parallel with the top of the crucible and at a distance therefrom which is determined to a considerable extent by their relative sizes. The rate of deposition on any point on the plate is approximately inversely proportional to the square of the distance between said point and the crucible. It follows that the distance between plate and crucible should be correspondingly increased for plates of substantially greater area than the top of the crucible in order that the rate of deposition be as nearly uniform as possible over the entire surface of the plate. If there is a material departure from these conditions, the deposited film may be of non-uniform thickness or the optic axis therein may be non-uniformly disposed, or both of these effects may occur.

The thickness of the deposited film may be readily controlled either visually, if a transparent bell jar is used, or by means of any suitable measuring and control device such as a photoelectric measuring device. The temperature of evaporation depends to a considerable extent upon the particular material being evaporated and may also vary within the safe operating range as explained above. For a given material and temperature, the time necessary to deposit a film of a given thickness depends on the distance between the crucible and the supporting plate, as is also explained above. As a specific example, if charge 30 comprises terephthalic acid and if plate 20 is approximately two inches in diameter and is positioned approximately four inches above and parallel with the top of crucible 26, a film having a thickness of the order of 5 wavelengths may be deposited in as little time as from 15 to 20 minutes from the time when heat is first applied to the charge.

When the foregoing conditions are observed, there will be formed on plate 20 an optically clear and glassy-appearing film, and when the charge comprises a material having rings of the benzene type in its molecules, said film may possess birefringence of a very high order, for example approximately 0.27 in the case of terephthalic acid. Furthermore, said film will be found to exhibit in polarized light the optical properties of a basal section of a uniaxial crystal. That is to say, it will be optically isotropic for light normally incident thereon but birefringent for obliquely incident light. When examined between polarizing elements in uncollimated light, it exhibits interference patterns at optical infinity characteristic of a basal section of a uniaxial crystal. Thus, for example, when said film is placed between circular polarizers, said pattern will comprise a series of concentric circles in the sequence of interference colors with the center of said pattern clear when said polarizers are circularly polarizing in the same sense and substantially black when said polarizers are circularly polarizing in the opposite sense. It is particularly significant that said film is uniaxial in spite of the fact that terephthalic acid normally occurs in the form of biaxial crystals. Moreover, this result is not limited to terephthalic acid but has been found to take place with other biaxial crystalline materials with which the present invention may be practiced, examples of which are given hereinafter.

It appears that the above optical properties of the films of the invention may be explained on the basis that the vaporized charge deposits on plate 20, in the form of individual molecules, small molecular aggregates or microcrystals in such manner that the atomic rings therein lie parallel to the surface of the plate and hence parallel to the surfaces of the film, which readily accounts for the birefringence of the film as well as the direction of its optic axis. In the case of terephthalic acid, for example, examination by X-ray diffraction reveals a pattern characteristic of a fibrous structure, with the fibre axis perpendicular to the plane of the film, and the conclusion is that the film is composed of a multiplicity of microcrystals cohering together to form an integral film and all oriented parallel to a common direction perpendicular to the plane of said film. On the other hand, the structure of birefringent films of other materials prepared in accordance with the invention may vary from a single crystal to a non-crystalline mass built up molecule by molecule and with all molecules oriented parallel to a common plane. The optical properties of the film would be substantially the same with either of these structures or any combination thereof, and all such forms of the invention are accordingly to be construed as coming within the scope hereof.

The present invention is subject to considerable modification, particularly with respect to the materials used in the practice thereof. It appears of substantial importance, however, that the compounds to be evaporated comprise molecules containing substantially planar, optically anisotropic groupings, and preferably substantially rigid planar groupings, such for example as benzenoid rings. It also appears important that the characteristics of said molecules be such that said amistropic groupings are readily orientable when the compound is treated in accordance with the invention. This result is apparently most readily obtained when the molecules themselves are substantially rigidly planar, as in the case of terephthalic acid, and it will be seen that this is in accordance with the above discussion of the optical properties of the films of the invention as deriving from uni-planar molecular orientation. Particularly satisfactory results from this aspect have been obtained with benzenoid compounds such, for example, as naphthalic acid, sulfanilic acid and diphenic acid, in addition to terephthalic acid. Compounds whose molecules comprise other aromatic rings such as pyridine rings are also desirable, for example nicotinic acid, as well as compounds whose molecules comprise other than six-membered rings. It should be expressly understood that the invention is not limited to cyclic compounds. On the contrary, highly birefringent films have been formed in accordance with the invention by the evaporation and deposition of non-cyclic compounds comprising planar molecules, such for example as fumaric acid. The term "evaporated and deposited" as used herein and in the claims is to be understood as referring to evaporation and deposition in a vacuum substantially as described herein.

In general it appears that other limits on the scope of the invention are practical rather than theoretical. For example, preferred results from the standpoint of a high degree of birefringence in the deposited films of the invention will be obtained with starting materials whose molecules are themselves inherently optically anisotropic, as has already been pointed out. Unsaturated compounds are a preferred example of such materials, but it should be expressly understood that the invention does not exclude saturated compounds, although the latter appear less desirable because their refractive indices and birefringence are generally substantially lower than those of the unsaturated compounds. The invention does not exclude the use of compounds producing birefringent films which also partially absorb visible light and may therefore appear colored when examined in white light. It appears of substantial importance from the standpoint of obtaining high birefringence in the deposited films of the invention to utilize compounds whose molecules contain polar groups, such as the carboxyl and amino groups in the above-noted examples of suitable materials. The presence of such groups appears to influence the deposition of the evaporated molecules in the desired uni-planar orientation.

It will readily be apparent that the materials to be evaporated in the practice of the invention should be solid both at room temperature and at any other temperatures under which the deposited film might be used, and it is desirable that said materials have as low vapor pressure as possible. Preferred results have been obtained with refractory compounds which are also soluble to a minimum degree in water or any common organic solvent. Thus, for example, a film of terephthalic acid produced as described above is both substantially infusible and substantially unaffected by water or any organic solvent, and such properties are preferred in the products of the invention. Another property of importance in selecting starting materials is molecular weight, which should be sufficiently low to permit vaporization without substantial decomposition, and it appears that the practical upper limit of molecular weight is of the order of 1000.

It is not necessary to use a glass supporting plate for the evaporated and deposited films of the invention. On the contrary, there appear to be no theoretical limits on the material of the support, and similar results have been obtained by deposition on such different materials as mica and various hard organic plastics such as methyl methacrylate and polystyrene. It is desirable that the support be substantially rigid, since otherwise it may bend under the conditions of the practice of the invention. In general, the films of the invention adhere quite strongly to the supports whereon they are formed, and it is usually most convenient to retain them on said supports in use, since they are relatively brittle. With this exception, however, said films are self-supporting and may be used without support in sufficient thicknesses. If such films are desired free from their support, one convenient procedure is to deposit a film of water-insoluble material on a plate of a readily water-soluble material, such for example as rock salt, and then to dissolve away the support with water. All such variations are to be understood as coming within the scope of the invention.

Since certain changes in carrying out the above process, and certain modifications in the product which embody the invention may be made without departing from its scope, it is intended that all matter contained in the above description, or shown in the accompanying drawing shall be interpreted as illustrative and not in a limiting sense.

What is claimed is:

1. As a new product, a light-transmitting, solid film comprising terephthalic acid, the molecules of which are oriented in substantial planar parallelism with the surfaces of said film, said film being optically isotropic for light normally incident thereon and exhibiting substantial birefringence for light obliquely incident thereon.

2. As a new product, an optical element comprising a multiplicity of microcrystalline particles cohering together and forming a substantially uniform film, said particles comprising terephthalic acid and being oriented parallel to the surfaces of said film, said film being optically isotropic for light normally incident thereon and exhibiting substantial birefringence for light obliquely incident thereon.

3. In a process of forming a birefringent element, the steps comprising evaporating terephthalic acid, and causing the resulting vapor to deposit on a supporting surface, said steps being carried out in a vacuum.

4. In a process of forming a birefringent element, the steps comprising applying heat substantially uniformly throughout a mass of organic material comprising terephthalic acid until said mass begins to vaporize, and causing the resulting vapor to deposit on a supporting surface, said steps being carried out in a vacuum.

5. As a new product, a light-transmitting support and a deposit thereon of a light-transmitting film comprising a multiplicity of particles of a solid, unsaturated benzenoid compound having a molecular weight below 1000 and having a low vapor pressure, the molecules of which contain planar ring groupings whereby said molecules are optically isotropic for light incident thereon in a direction normal to the plane of each said ring grouping and birefringent for light incident thereon at other angles, said particles cohering together and forming a substantially uniform film, the molecules of said film being oriented with their planar groupings in substantial parallelism to the surface of said film, said film being optically isotropic for light incident thereon in a direction normal thereto and exhibiting substantial birefringence for light incident thereon at other angles.

ROBERT B. WOODWARD.

REFERENCES CITED

The following references are of record in the file of this patent:

UNITED STATES PATENTS

| Number | Name | Date |
| --- | --- | --- |
| 1,685,624 | Andrews | Sept. 25, 1928 |
| 1,878,970 | Mills | Sept. 20, 1932 |
| 1,926,716 | Ehringhaus | Sept. 12, 1933 |
| 1,928,105 | Kern | Sept. 26, 1933 |
| 1,987,282 | Comte | Jan. 8, 1935 |
| 2,265,522 | Farkas | Dec. 9, 1941 |
| 2,270,323 | Land et al. | Jan. 20, 1942 |
| 2,306,222 | Potnode | Dec. 22, 1942 |
| 2,328,219 | Land | Aug. 31, 1943 |
| 2,338,234 | Dimmick | Jan. 4, 1944 |
| 2,378,476 | Guellick | June 19, 1945 |
| 2,400,877 | Dreyer | May 28, 1946 |

OTHER REFERENCES

Hackh's Chemical Dictionary, 3rd Edition, June 1944, page 836.

Spense article in Journal of Physical Chem., vol. 43, Oct. 1939, pages 865, 878.